(12) United States Patent
Melohn

(10) Patent No.: US 12,716,440 B2
(45) Date of Patent: Aug. 25, 2026

(54) MANNEQUIN DISPLAY FITTING LOCK MECHANISM

(71) Applicant: LEO D. BERNSTEIN & SONS, INC., New York, NY (US)

(72) Inventor: Richard Joseph Melohn, Santa Monica, CA (US)

(73) Assignee: LEO D. BERNSTEIN & SONS, INC., New York, NY (US)

( * ) Notice: Subject to any disclaimer, the term of this patent is extended or adjusted under 35 U.S.C. 154(b) by 616 days.

(21) Appl. No.: 18/303,775

(22) Filed: Apr. 20, 2023

(65) Prior Publication Data

US 2024/0352771 A1 Oct. 24, 2024

(51) Int. Cl.
*F16B 7/04* (2006.01)
*A47F 8/00* (2006.01)

(52) U.S. Cl.
CPC ................ *F16B 7/042* (2013.01); *A47F 8/00* (2013.01); *Y10T 403/599* (2015.01); *Y10T 403/602* (2015.01); *Y10T 403/608* (2015.01); *Y10T 403/7077* (2015.01)

(58) Field of Classification Search
CPC ..... A47F 8/00; A63H 3/46; F16B 2/18; F16B 7/042; F16B 7/105; F16B 21/10; F16B 21/12; F16B 21/125; F16B 21/16; F16B 21/165; Y10T 403/32483; Y10T 403/591; Y10T 403/599; Y10T 403/602; Y10T 403/608; Y10T 403/7077
USPC .......... 403/109.3, 322.1, 325, 327, 330, 377
See application file for complete search history.

(56) References Cited

U.S. PATENT DOCUMENTS 593,190 A * 11/1897 Bernhardt ........... F16L 37/0841 403/327
998,318 A * 7/1911 Young ..................... F16B 21/18 403/327
1,067,367 A * 7/1913 Noster ...................... B62B 1/04 403/317
2,632,586 A * 3/1953 Barrango .................. A47F 8/00 446/379

(Continued)

FOREIGN PATENT DOCUMENTS

CN 1387811 A 1/2003
CN 212678829 U 3/2021

(Continued)

OTHER PUBLICATIONS

International Search report and Written Opinion mailed Jun. 13, 2024 for PCT/US2024/021413.

*Primary Examiner* — Josh Skroupa
(74) *Attorney, Agent, or Firm* — Plumsea Law Group, LLC

(57) ABSTRACT

A display fitting lock mechanism for a mannequin to removably attach a mannequin part to another mannequin. The lock mechanism includes a shaft member having a shaft body including a recess. The lock mechanism also includes a receiving portion having a straight tube. The straight tube includes an interior channel extending through a longitudinal length of the straight tube that is configured to receive the shaft body of the shaft member. The lock mechanism further includes a locking clamp attached to the straight tube. The locking clamp having a locking tooth that is configured to extend into the recess in the shaft body when the locking clamp is in a locked position.

20 Claims, 11 Drawing Sheets

(56) References Cited

U.S. PATENT DOCUMENTS 2,682,414 A * 6/1954 Richardson ......... B25B 23/0042 403/325
3,306,639 A * 2/1967 Lyon ....................... F16B 7/105 403/109.3
4,329,078 A * 5/1982 Crates ..................... F16B 7/042 403/329
5,123,664 A 6/1992 DeMars
5,387,048 A 2/1995 Kuo
5,797,696 A * 8/1998 Baynes ................... F16B 7/042 403/377
5,983,455 A * 11/1999 Polzin ...................... B25G 1/04 15/144.4
7,040,832 B2 * 5/2006 Hsieh ...................... F16B 7/105 403/377
7,155,774 B2 * 1/2007 Jung ....................... F16B 7/042 285/7
7,234,887 B2 * 6/2007 Chiang ..................... A47F 8/00 403/322.2
8,128,306 B2 * 3/2012 Gorza ................... F16B 7/1454 403/109.5
8,267,390 B2 9/2012 Dellach
8,414,460 B2 * 4/2013 Todokoro ................ F16B 7/042 482/41
9,248,072 B2 * 2/2016 Wu ......................... F16B 7/105
9,398,820 B2 * 7/2016 Firestone ................ F16C 11/12
9,648,805 B2 * 5/2017 Nie ....................... F16B 7/1418
9,764,458 B1 * 9/2017 Resh ........................ B25G 1/04
9,943,192 B2 * 4/2018 Yang ....................... F16B 7/105
10,611,013 B2 * 4/2020 Cavaliere ................. B25G 1/04
10,890,201 B2 * 1/2021 Tsai ........................ F16B 7/105
11,700,950 B2 * 7/2023 Choi ....................... F16B 7/105 5/174
11,951,952 B2 * 4/2024 Wang ...................... F16B 7/105
12,005,562 B2 * 6/2024 Lin .......................... F16B 7/105
12,398,578 B2 * 8/2025 Alma ...................... F16B 7/105
2003/0190183 A1 * 10/2003 Hsing ..................... F16B 7/042 403/52
2004/0141805 A1 * 7/2004 Chiang ..................... A47F 8/00 403/353
2005/0040644 A1 2/2005 Tawara et al.
2006/0062632 A1 * 3/2006 Jang ........................ F16B 7/105 403/378
2006/0234599 A1 10/2006 Mo et al.
2024/0052866 A1 * 2/2024 Foster ..................... F16B 7/105
2024/0141647 A1 * 5/2024 Scott ......................... F16B 7/02
2024/0175525 A1 * 5/2024 Becerra Alvarado ... F16B 7/042

FOREIGN PATENT DOCUMENTS

DE 4013331 C1 * 6/1991 .............. F16B 7/105
DE 102009031533 A1 * 2/2010 .............. F16B 21/16
EP 1327783 B1 12/2006
EP 2386226 B1 6/2016
FR 2886988 A3 * 12/2006 .............. F16B 7/105
GB 257406 A * 9/1926 .............. F16B 7/105
GB 2282841 B 6/1993
JP 3165550 U 1/2011
JP 5107416 B2 12/2012
WO WO-2007028286 A1 * 3/2007 .............. F16B 7/105
WO WO-2013000799 A1 * 1/2013 ............. A47L 9/242

* cited by examiner

MANNEQUIN DISPLAY FITTING LOCK MECHANISM

BACKGROUND

The present disclosure relates to clothing forms, and more particularly, to a mannequin display fitting lock mechanism.

Clothing forms, such as mannequins, may be a full or partial representation of a body used to display clothing. Some mannequins may be a representation of a complete body, with or without a head. Other mannequins may be a representation of only a part of a body, such as a torso. Mannequins may also include representations of other parts of a body, such as arms, legs, hands, and feet. These parts may be posable and often can also be detachably removed from the body of the mannequin. For example, removeable parts such as arms, legs, hands, and feet of a mannequin may assist with placing items of clothing onto the mannequin.

Given the ability to remove certain parts of the mannequin, these removeable parts may become separated from the body of the mannequin. Because of their small size relative to other parts of the mannequin, mannequin hands can be particularly susceptible to being displaced from the rest of the parts of the mannequin. For example, mannequin hands may be removed from the mannequin arms and can be lost or, in some cases, taken or stolen by people.

There is a need in the art for an improved mannequin display fitting lock mechanism that can assist with keeping mannequin parts with the mannequin.

SUMMARY OF THE INVENTION

In one aspect, a display fitting lock mechanism for a mannequin is provided. The lock mechanism includes a shaft member having a shaft body including a recess. The lock mechanism also includes a receiving portion having a straight tube. The straight tube includes an interior channel extending through a longitudinal length of the straight tube that is configured to receive the shaft body of the shaft member. The lock mechanism further includes a locking clamp attached to the straight tube. The locking clamp having a locking tooth that is configured to extend into the recess in the shaft body when the locking clamp is in a locked position.

In another aspect, a display fitting lock mechanism for a mannequin is provided. The lock mechanism includes a shaft member having a shaft body extending from one end to a tip at an opposite end. The shaft body includes a recess. The lock mechanism also includes a receiving portion including a straight tube having an interior channel extending through a longitudinal length of the straight tube that is configured to receive the shaft body of the shaft member. The shaft member is locked in position relative to the receiving portion when the shaft body of the shaft member is fully inserted into the interior channel of the straight tube of the receiving portion.

In still another aspect, a kit of parts for a display fitting lock mechanism for a mannequin is provided. The kit of parts includes a shaft member having a shaft body including a recess. The kit of parts also includes a receiving portion having a straight tube including a recess aligned with the recess in the shaft body of the shaft member. The kit of parts further includes a locking clamp attached to the straight tube. The locking clamp having a locking tooth that is configured to extend into the recess in the shaft body through the recess in the straight tube when the locking clamp is in a locked position.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

According to the techniques described herein, a mannequin display fitting lock mechanism is provided that secures a mannequin part to the mannequin body or to another mannequin part. With this arrangement, mannequin parts may be kept together with the mannequin to prevent the parts from being lost or stolen.

In general, a mannequin may include multiple removeable parts so that the mannequin may be posed and adjusted. The ability to pose a mannequin allows not only variety or presentations but also adjustability for size, lighting conditions, type of clothing, and so on. Also, for example, it may be possible to place clothing onto a mannequin more easily or efficiently if it can be partially disassembled. However, smaller mannequin parts, such as hands and/or feet, may easily become lost or stolen when separated from the mannequin. The mannequin display fitting lock mechanism of the present embodiments provides an arrangement that secures the mannequin part to the rest of the mannequin or another mannequin part while still permitting the part to be removed and/or posed.

Figure 1:
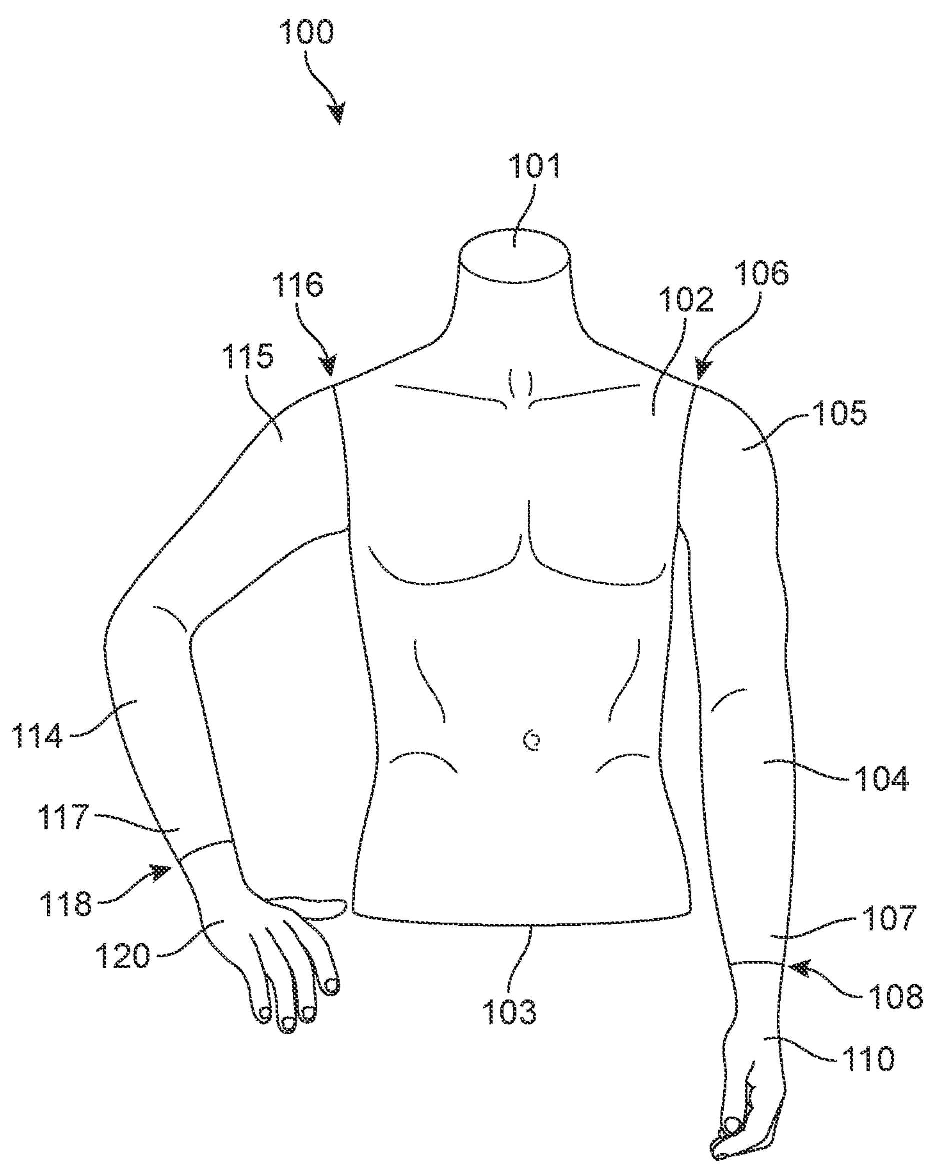
FIG. 1 is a representative view of an example embodiment of a mannequin.

Referring now to FIG. 1, an example embodiment of a mannequin 100 is shown. In this embodiment, mannequin 100 is a partial representation of a body and includes a torso 102 that extends between a head end 101 and a pelvis end 103. In some embodiments, mannequin 100 may include one or more mannequin parts that are attached to torso 102. In this embodiment, mannequin 100 includes a first arm 104 that extends from a shoulder end 105 to a wrist end 107 at an opposite end of first arm 104. First arm 104 is configured to removably attach to torso 102 at a first upper attachment point 106. As shown in FIG. 1, shoulder end 105 of first arm 104 attaches to torso 102 at first upper attachment point 106.

At the opposite end of first arm 104 from shoulder end 105 and first upper attachment point 106, a hand part 110 is removably attached to wrist end 107 of first arm 104 at a first lower attachment point 108. In this embodiment, first arm 104 is a left arm on the left side of mannequin 100 and hand part 110 is a left hand. Mannequin 100 may have a substantially similar arrangement of parts on the opposite right side.

In this embodiment, mannequin 100 includes a second arm 114 that extends from a shoulder end 115 to a wrist end 117 at an opposite end of second arm 114. Second arm 114 is configured to removably attach to torso 102 at a second upper attachment point 116. As shown in FIG. 1, shoulder end 115 of second arm 114 attaches to torso 102 at second upper attachment point 116. At the opposite end of second arm 114 from shoulder end 115 and second upper attachment point 116, a hand part 120 is removably attached to wrist end 117 of second arm 114 at a second lower attachment point 118. In this embodiment, second arm 114 is a right arm on the right side of mannequin and hand part 120 is a right hand.

In some embodiments, the configuration or shape of first arm 104 (e.g., a left arm on the left side of mannequin 100) may be different from the configuration or shape of second arm 114 (e.g., a right arm on the right side of mannequin 100). For example, as shown in FIG. 1, first arm 104 is in a relatively straight configuration extending along the left side of torso 102, while second arm 114 has a bent configuration at an elbow and extends away from the right side of torso 102. In other embodiments, first arm 104 and second arm 114 may be similar to each other or may have varying configurations, sizes, or shapes different than the example embodiment of mannequin 100 shown in the Figures.

In some embodiments, the various mannequin parts are configured to removably attach or connect to torso 102 of mannequin 100 and to other mannequin parts at the attachment points. As shown in FIG. 1, display fittings are used as attachment mechanisms at the attachment points of mannequin 100, including first upper attachment point 106 and second upper attachment point 116. For example, conventional display fittings may be keyhole-style attachment mechanisms, where one portion of the fitting has a key feature and the other portion of the fitting has a key receiver. Other types of conventional display fittings for mannequins are well-known to the skilled practitioner and may be used with the mannequins described herein.

According to the example embodiments, one or more display fittings at selected attachment points may include a lock mechanism that secures the mannequin part from being removed from its attachment point until released by unlocking the lock mechanism. In one embodiment, at least first lower attachment point 108 and/or second lower attachment point 118 include a lock mechanism according to the techniques described herein to removably and securely attach hand part 110 to first arm 104 and/or hand part 120 to second arm 114. Additionally, the display fitting lock mechanism of the example embodiments described herein allows the mannequin part (e.g., hand part 110 and/or hand part 120) to rotate or be posed while locked in place.

Figure 2:
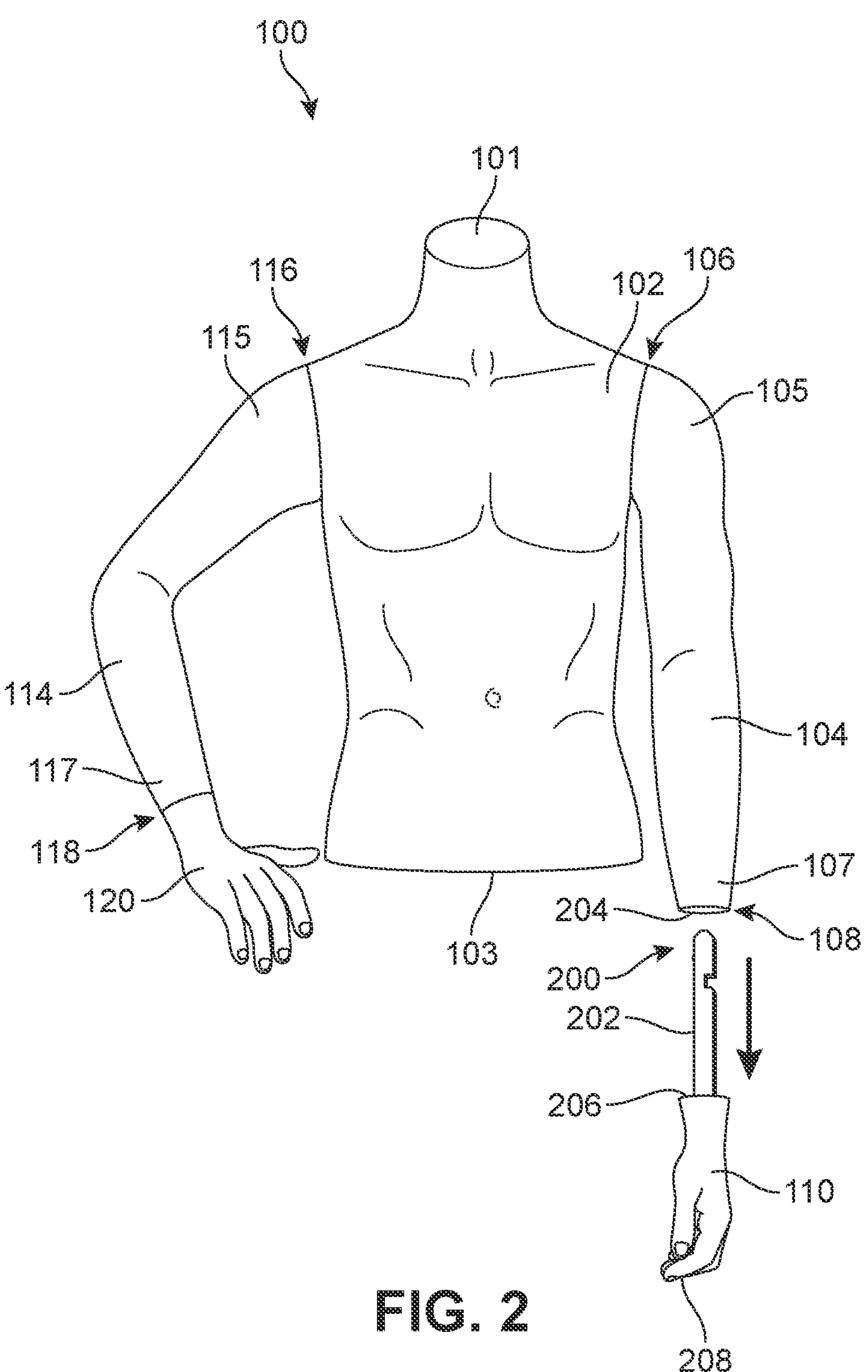
FIG. 2 is a representative view of a hand part of the mannequin of FIG. 1 being removed from an arm part of the mannequin.

Referring now to FIG. 2, mannequin 100 is shown with hand part 110 being removed from first arm 104 at first lower attachment point 108. In this embodiment, a mannequin display fitting lock mechanism 200 (also referred to herein as lock mechanism 200) is provided at first lower attachment point 108 to removably and securely attach hand part 110 to wrist end 107 of first arm 104. As will be described in more detail below, lock mechanism 200 includes a shaft member 202 associated with hand part 110 and a receiving portion 204 associated with first arm 104. In this embodiment, shaft member 202 is disposed at a first end 206 (e.g., the proximal end) of hand part 110 opposite a second end 208 (e.g., the distal end). A tip 210 of shaft member 202 is configured to be inserted into receiving portion 204 of lock mechanism 200 disposed inside first arm 104 at wrist end 107 to mate hand part 110 with first arm 104 at first lower attachment point 108. With this arrangement, lock mechanism 200 allows hand part 110 to be locked into engagement with wrist end 107 of first arm 104 at first lower attachment point 108 until released by unlocking lock mechanism 200.

Figure 3:
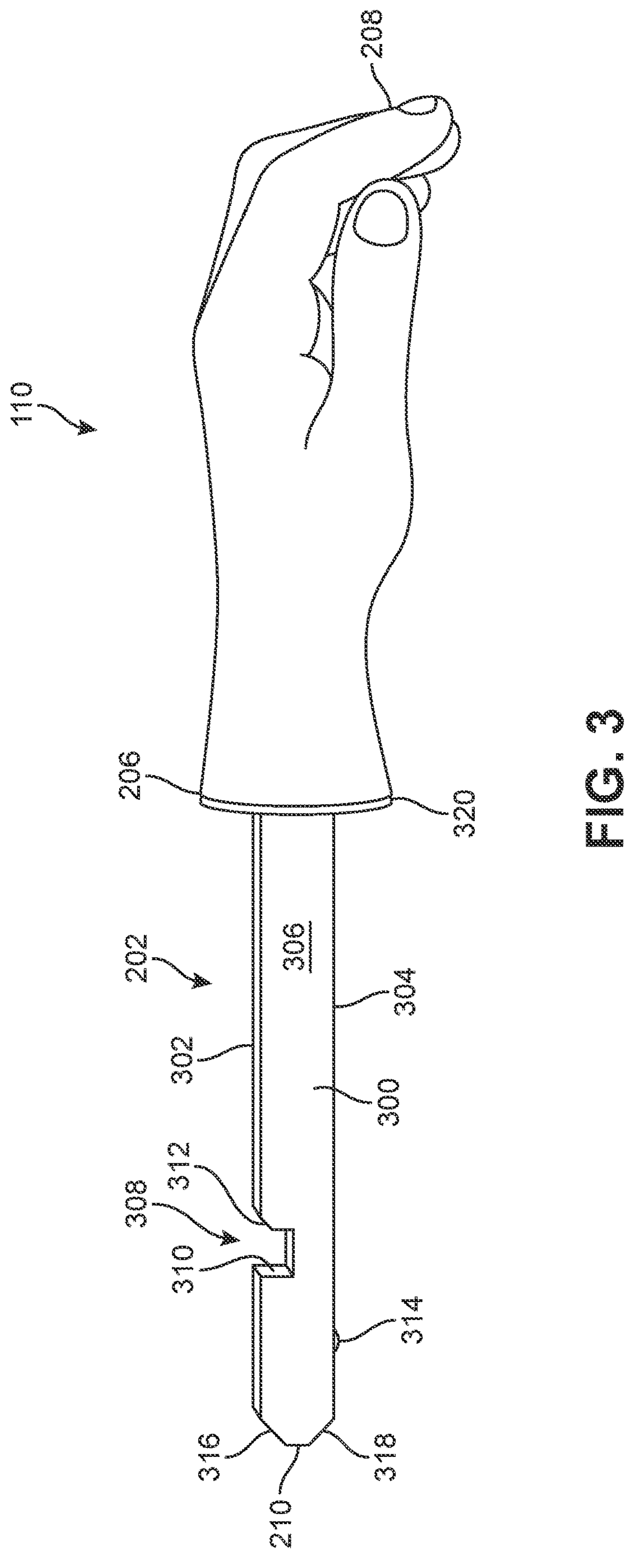
FIG. 3 is a representative view of an example embodiment of a hand part of the mannequin including a portion of a mannequin display fitting lock mechanism.

FIG. 3 illustrates an example embodiment of hand part 110 of mannequin 100 including a portion of lock mechanism 200. In this embodiment, the portion of lock mechanism 200 included on hand part 110 includes shaft member 202. As shown in FIG. 3, shaft member 202 of lock mechanism 200 extends from first end 206 of hand part 110 to tip 210 disposed at the opposite end. In one embodiment, shaft member 202 includes an elongate shaft body 300 having a square cross-sectional shape. In this embodiment, the square cross-sectional shape of shaft body 300 includes four flat planar surfaces, including a top face 302 and an opposite bottom face 304, as well as a first side face 306 and an opposite second side face (not shown) on the other side of shaft body 300. Together, top face 302, bottom face 304, first side face 306, and the second side face define the square cross-sectional shape of shaft body 300.

In some embodiments, shaft body 300 of shaft member 202 may include a recess 308 disposed in one of the flat planar surfaces of the faces of shaft body 300. In this embodiment, recess 308 is shown disposed in top face 302. Recess 308 extends at least partially downwards in a direction from top face 302 towards bottom face 304 and extends through a width of shaft body 300 from first side face 306 to the second side face. In an example embodiment, one edge or side of recess 308 may include a straight edge 310 and another edge or side of recess 308 may include a beveled or chamfered edge 312. In this embodiment, straight edge 310 of recess 308 is located closer to tip 210 of shaft member 202 than beveled edge 312 and beveled edge 312 is located closer to first end 206 of hand part 110 than straight edge 310. In one embodiment, beveled edge 312 is angled at approximately 45 degrees and straight edge 310 is a right angle (e.g., 90 degrees).

In some embodiments, shaft body 300 of shaft member 202 may also include a retaining ball 314 disposed in bottom face 304. In an example embodiment, retaining ball 314 is press fit into a corresponding cavity located on bottom face 304. Retaining ball 314 is configured to mechanically engage with an opening in receiving portion 204 of lock mechanism 200 to provide a friction fit between shaft member 202 and receiving portion of lock mechanism 200, as will be described below.

In an example embodiment, tip 210 of shaft member 202 may include a pair of chamfered or beveled surfaces that are configured to engage with receiving portion 204 of lock mechanism 200 to help guide and locate shaft member 202 relative to receiving portion 204. As shown in FIG. 3, tip 210 includes a top chamfered surface 316 extending at a downward angle from top face 302 in a direction towards bottom face 304 and a bottom chamfered surface 318 extending at an upward angle from bottom face 304 in a direction towards top face 302. In some cases, the angle of top chamfered surface 316 and bottom chamfered surface 318 may be the same. In other cases, the angles of top chamfered surface 316 and bottom chamfered surface 318 may be different. As shown in FIG. 3, top chamfered surface 316 and bottom chamfered surface 318 are both approximately 45 degrees.

In an example embodiment, shaft member 202 further includes a plate 320 disposed at an end opposite tip 210. Plate 320 is adjacent to first end 206 of hand part 110 and is configured to have a generally circular shape with a circumference that corresponds to or is slightly smaller (e.g., within 1-2 mm) of a circumference of first end 206 of hand part 110. In some embodiments, hand part 110 may be attached to shaft member 202 of lock mechanism 200 by plate 320 at first end 206 of hand part 110.

Figure 4:
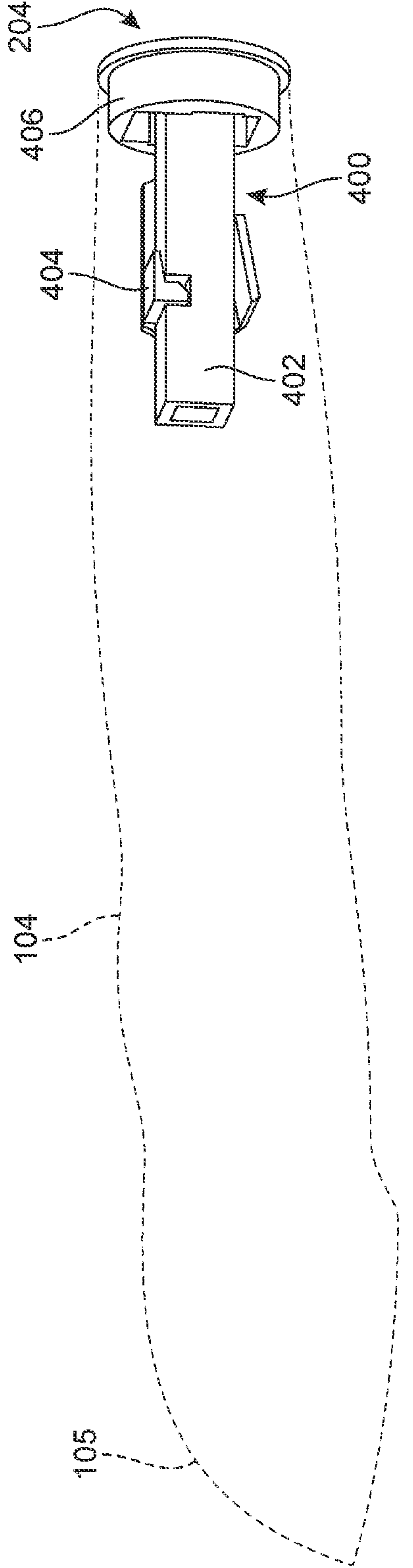
FIG. 4 is a representative view of an example embodiment of an arm part of the mannequin including another portion of the mannequin display fitting lock mechanism.

FIG. 4 illustrates an example embodiment of first arm 104 of mannequin 100 including another portion of lock mechanism 200. In this embodiment, first arm 104 is a left arm that extends from shoulder end 105 to wrist end 107 at an opposite end of first arm 104 in a relatively straight configuration. Shoulder end 105 of first arm 104 is configured to attach to torso 102 of mannequin 100 at first upper attachment point 106 (shown in FIGS. 1 and 2). A hand part, such as hand part 110 may be separately manufactured and then attached to wrist end 107 of first arm 104. In an example embodiment, receiving portion 204 of lock mechanism 200 may be located at wrist end 107 of first arm 104. As described above, receiving portion 204 is configured to receive shaft member 202.

In some embodiments, receiving portion 204 of lock mechanism 200 includes a receiver assembly 400 that is inserted into first arm 104 at wrist end 107. A shown in FIG. 4, receiver assembly 400 extends inside or within first arm 104 in a direction from wrist end 107 towards shoulder end 105. In an example embodiment, receiver assembly 400 includes a straight tube 402 extending in a direction from wrist end 107 towards shoulder end 105 within first arm 104. Straight tube 402 is configured to receive shaft member 202 of lock mechanism 200 through receiving portion 204 when hand part 110 is attached at wrist end 107 of first arm 104.

In this embodiment, straight tube 402 has a square cross-sectional shape with inside dimensions that corresponds to outside dimensions of shaft body 300 of shaft member 202 so that shaft body 300 may be inserted within the inside of straight tube 402. In an example embodiment, the corresponding square cross-sectional shapes prevent rotation of shaft body 300 relative to straight tube 402 so that the position of the mannequin part (e.g., hand part 110) relative to the other mannequin part (e.g., first arm 104) is maintained. In other embodiments, shaft body 300 of shaft member 202 and straight tube 402 of receiver assembly 400 may have other similar corresponding cross-sectional shapes, such as circular, ovoid, triangular, rectangular, etc., so that shaft body 300 fits within the inside of straight tube 402.

In an example embodiment, receiver assembly 400 of receiving portion 204 of lock mechanism 200 may include a locking clamp 404. Locking clamp 404 is attached to straight tube 402 of receiver assembly 400 via a pivot point and torsion spring. With this arrangement, locking clamp 404 is moveable between a locked position when it engages and secures shaft body 300 of shaft member 202 within straight tube 402 and an unlocked position when shaft body 300 of shaft member 202 is permitted to slidably move within straight tube 402. The locking and unlocking of lock mechanism 200 using locking clamp 404 will be described in more detail below with reference to FIGS. 8 through 11.

In some embodiments, receiver assembly 400 of receiving portion 204 of lock mechanism 200 may include a collar insert 406 located at wrist end 107 of first arm 104. In an example embodiment, collar insert 406 may attach to first arm 104 at wrist end 107 so that receiver assembly 400 may be fitted within the interior of first arm 104. In some cases, collar insert 406 may be inserted into a mold during the manufacture of first arm 104 so that first arm 104 and collar insert 406 are integrally manufactured together. In other cases, collar insert 406 may be added to wrist end 107 of first arm 104 after manufacture of first arm 104, for example, using screws, adhesive, or other types of fasteners. With this arrangement, receiver assembly 400 may be attached at wrist end 107 of first arm 104 by collar insert 406. Additionally, collar insert 406 may be configured to be in contact with or adjacent to plate 320 at first end 206 of hand part 110 when hand part 110 is attached to first arm 104.

Figure 5:
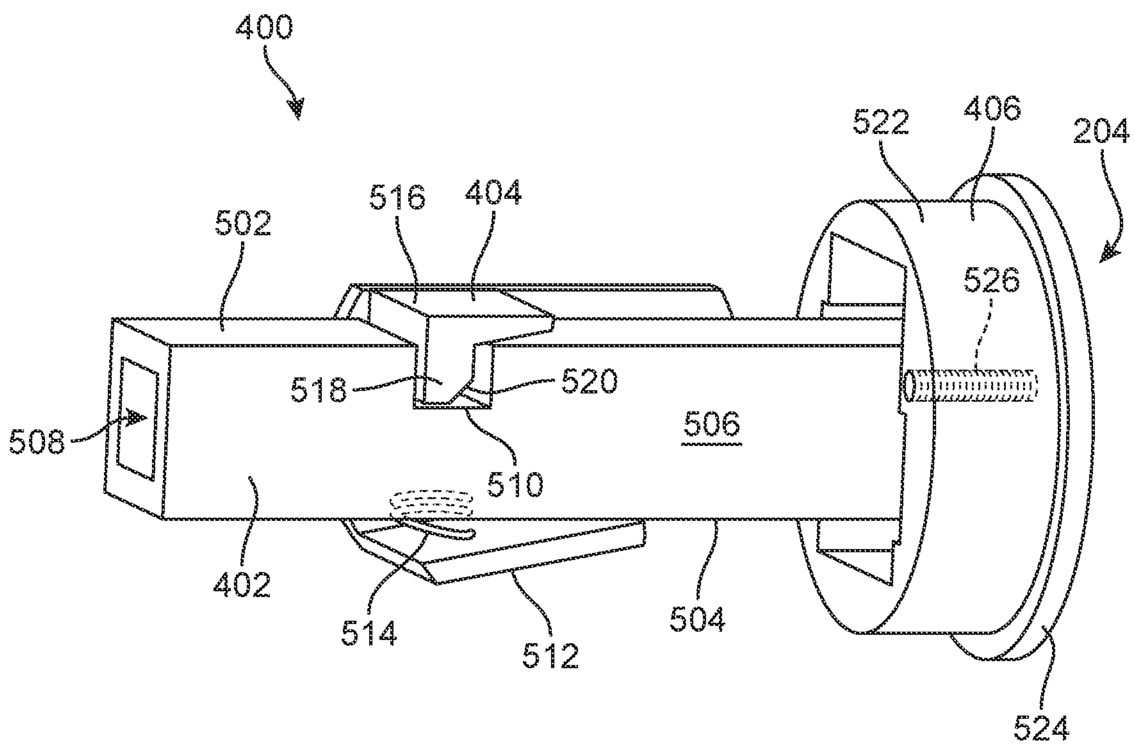
FIG. 5 is an isometric side view of a receiving portion of the mannequin display fitting lock mechanism.

Referring now to FIG. 5, receiver assembly 400 of receiving portion 204 of lock mechanism 200 is shown removed from first arm 104. In one embodiment, receiver assembly includes elongate straight tube 402 having a square cross-sectional shape. In this embodiment, the square cross-sectional shape of straight tube 402 includes four flat planar surfaces, including a top face 502 and an opposite bottom face 504, as well as a first side face 506 and an opposite second side face (second side face 606 shown in FIG. 6) on the other side of straight tube 402. Together, top face 502, bottom face 504, first side face 506, and second side face 606 define the square cross-sectional shape of straight tube 402.

In an example embodiment, straight tube 402 includes an interior channel 508 extending through the longitudinal length of straight tube 402. Interior channel 508 is configured to receive shaft body 300 of shaft member 202 of lock mechanism 200 so that shaft body 300 is inserted within straight tube 402. As noted above, the dimensions of interior channel 508 of straight tube 402 correspond to the outside dimensions of shaft body 300 of shaft member 202 so that shaft body 300 may be inserted within interior channel 508 of straight tube 402.

In some embodiments, straight tube 402 may include a recess 510 disposed in one of the flat planar surfaces of the faces of straight tube 402. In this embodiment, recess 510 is disposed in top face 502. Recess 510 extends at least partially downwards in a direction from top face 502 towards bottom face 504 so as to provide an opening into interior channel 508. Recess 510 extends through a width of straight tube 402 from first side face 506 to the second side face. In an example embodiment, sides of recess 510 may include straight edges. The location of recess 510 on straight tube 402 corresponds to the location of recess 308 on shaft body 300 of shaft member 202 so that when shaft member 202 is inserted within interior channel 508 of straight tube 402, recess 510 and recess 308 are aligned (in the vertical direction between the top and bottom faces).

In an example embodiment, receiver assembly 400 of receiving portion 204 of lock mechanism 200 includes locking clamp 404. Locking clamp 404 is attached to straight tube 402 of receiver assembly 400 via a pivot point on the second side face and a torsion spring (not shown) assists with moving locking clamp 404 between the locked and unlocked positions. In some embodiments, locking clamp 404 includes a first (bottom) clamp surface 512 disposed beneath bottom face 504 of straight tube 402. In an example embodiment, locking clamp 404 also includes a compression spring 514 that is located between bottom face 504 of straight tube 402 and an inner side of first clamp surface 512. With this arrangement, compression spring 514 applies a force against bottom face 504 of straight tube 402 to push first clamp surface 512 downward so that locking clamp 404 is biased towards the locked position.

In an example embodiment, locking clamp 404 also includes a second (top) clamp surface 516. In this embodiment, second clamp surface 516 is located on an opposite side of straight tube 402 and is disposed above top face 502 of straight tube 402. Extending in a downward direction from second clamp surface 516 is a locking tooth 518. Locking tooth 518 is a projection that extends vertically beneath second clamp surface 516 and extends into recess 510 of straight tube 402. When locking clamp 404 is in the locked position, locking tooth 518 is disposed within recess 510 of straight tube 402 and recess 308 of shaft body 300 of shaft member 202. With this arrangement, locking tooth 518 of locking clamp 404 acts to secure shaft body 300 of shaft member 202 within interior channel 508 of straight tube 402 of receiving portion 204.

In one embodiment, one side of locking tooth 518 may include a beveled surface 520. In this embodiment, beveled surface 520 of locking tooth 518 is facing towards collar insert 406. The angle of beveled surface 520 of locking tooth 518 corresponds with and is the same as the angle of beveled edge 312 of recess 308. In one embodiment, beveled surface 520 of locking tooth 518 has an angle of approximately 45 degrees. The corresponding bevels may assist with allowing the surfaces to slide relative to each other to engage engaging tooth 518 within recess 308 of shaft body 300 of shaft member 202.

In an example embodiment, collar insert 406 is disposed at one end of receiver assembly 400 and provides a way for receiving portion 204 of lock mechanism 204 to be integrated into a mannequin part, such as first arm 104 (as shown in FIG. 4). Collar insert 406 includes a collar body 522 having a round shape and configured to hold and align straight tube 402 of receiver assembly 400 in a substantially straight configuration. Collar insert 406 also includes a lip 524 disposed around the outside of collar body 522. Lip 524 of collar insert 406 has a larger circumference than collar body 522 so that when receiver assembly 400 of receiving portion 204 of lock mechanism 200 is inserted into a mannequin part (e.g., first arm 104), collar body 522 of collar insert 406 extends into the mannequin part and lip 524 remains on the outside of the mannequin part. With this arrangement, when shaft member 202 on hand part 110 is inserted into receiving portion 204, plate 320 at first end 206 of hand part 110 contacts lip 524 of collar insert 406 when hand part 110 is attached to first arm 104.

As described above, in some cases, collar insert 406 may be integrally formed with a mannequin part, such as first arm 104, by including collar insert 406 within a mold used to form the mannequin part. For example, the mannequin part may be formed with collar insert 406 using an injection mold. In other cases, collar insert 406 may be added to the mannequin part after the mannequin part is manufactured. For example, first arm 104 may be molded or formed and receiving portion 204 of lock mechanism 200 may be added after manufacturing. In these cases, collar insert 406 of receiver assembly 400 may include fastener holes 526 disposed within collar body 522 of collar insert 406. Fastener holes 526 allow a fastener, such as a screw or bolt, to be used to attach collar insert 406 to a mannequin part (e.g., first arm 104). In this embodiment, collar insert 406 includes two fastener holes 526. It should be understood that any number of fastener holes may be used. With this arrangement, collar insert 406 may be secured to the mannequin part to hold receiver assembly 400 of receiving portion 204 in place.

Figure 6:
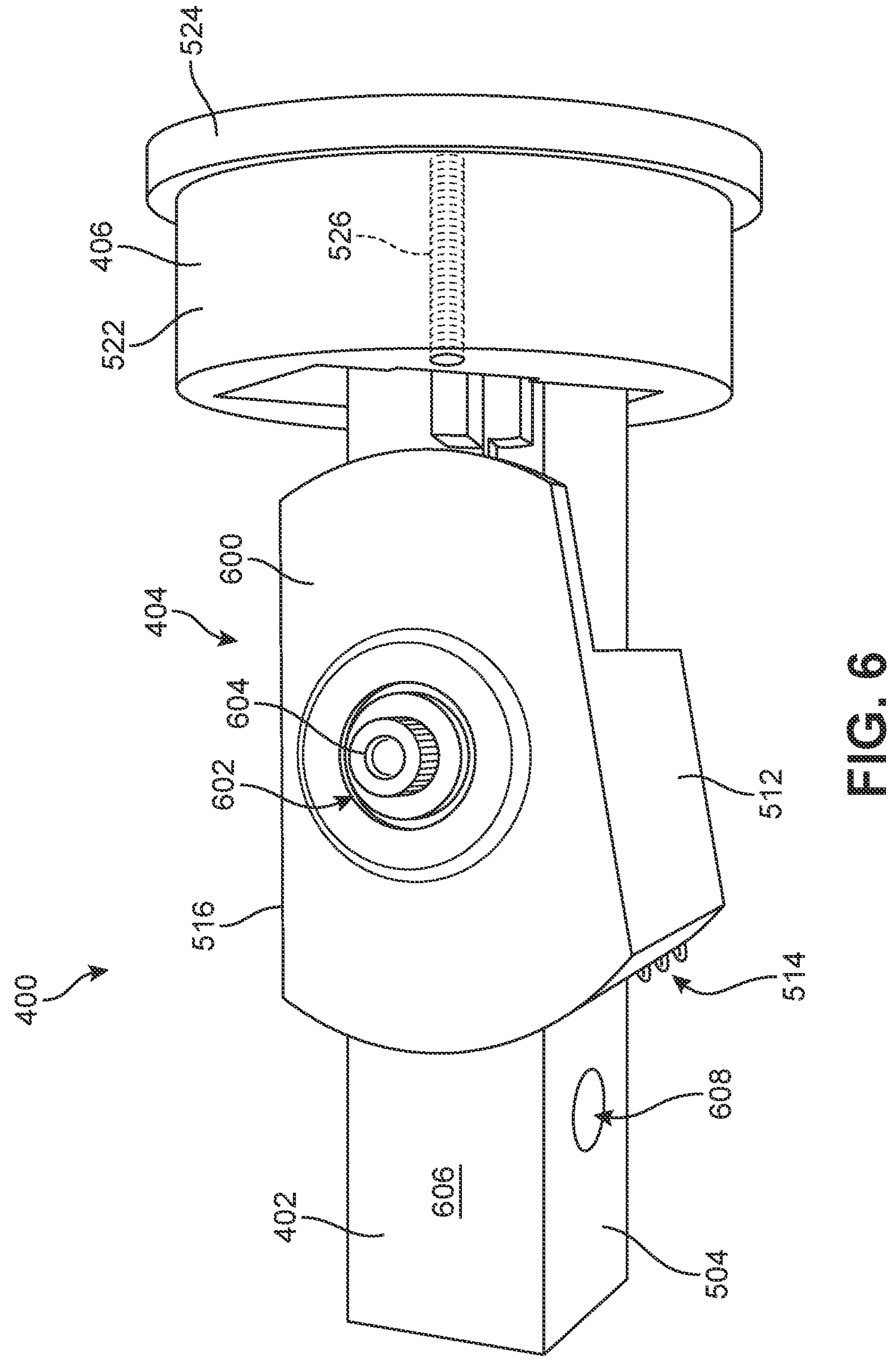
FIG. 6 is an isometric side view of the receiving portion of the mannequin display fitting lock mechanism.

Referring now to FIG. 6, an opposite side of receiver assembly 400 is shown from the view in FIG. 5. In this embodiment, a side surface 600 of locking clamp 404 is shown disposed along second side face 606 of straight tube 402. As shown in FIG. 6, locking clamp 404 is attached to second side face 606 of straight tube 402 at a pivot point 602 using a fastener 604. Fastener 604 allows locking clamp 404 to rotate or pivot at pivot point 602 relative to second side face 606 of straight tube 402 to move locking clamp 404 between the locked position and the unlocked position. A torsion spring (not visible) wrapped around fastener 604 is disposed between side surface 600 of locking clamp 404 and second side face 606 of straight tube 402 further assists with transitioning locking clamp 404 between the locked and unlocked positions. Together, the torsion spring and compression spring 514 act to bias locking clamp 404 in the locked position until locking clamp 404 is released to be unlocked, as will be described below.

Additionally, in some embodiments, straight tube 402 of receiver assembly 400 may include a detent hole 608 in bottom face 504. Retaining ball 314 is configured to mechanically engage with detent hole 608 in bottom face 504 of straight tube 402 of receiver assembly 400 to provide a friction fit between shaft member 202 and receiving portion 204 of lock mechanism 200. With this arrangement, when shaft body 300 of shaft member 202 is locked in place within interior channel 508 of straight tube 402 of receiving portion 204, detent hole 608 and retaining ball 314 provide a mechanical friction fit that acts to keep lock mechanism 200 in the locked position.

Figure 7:
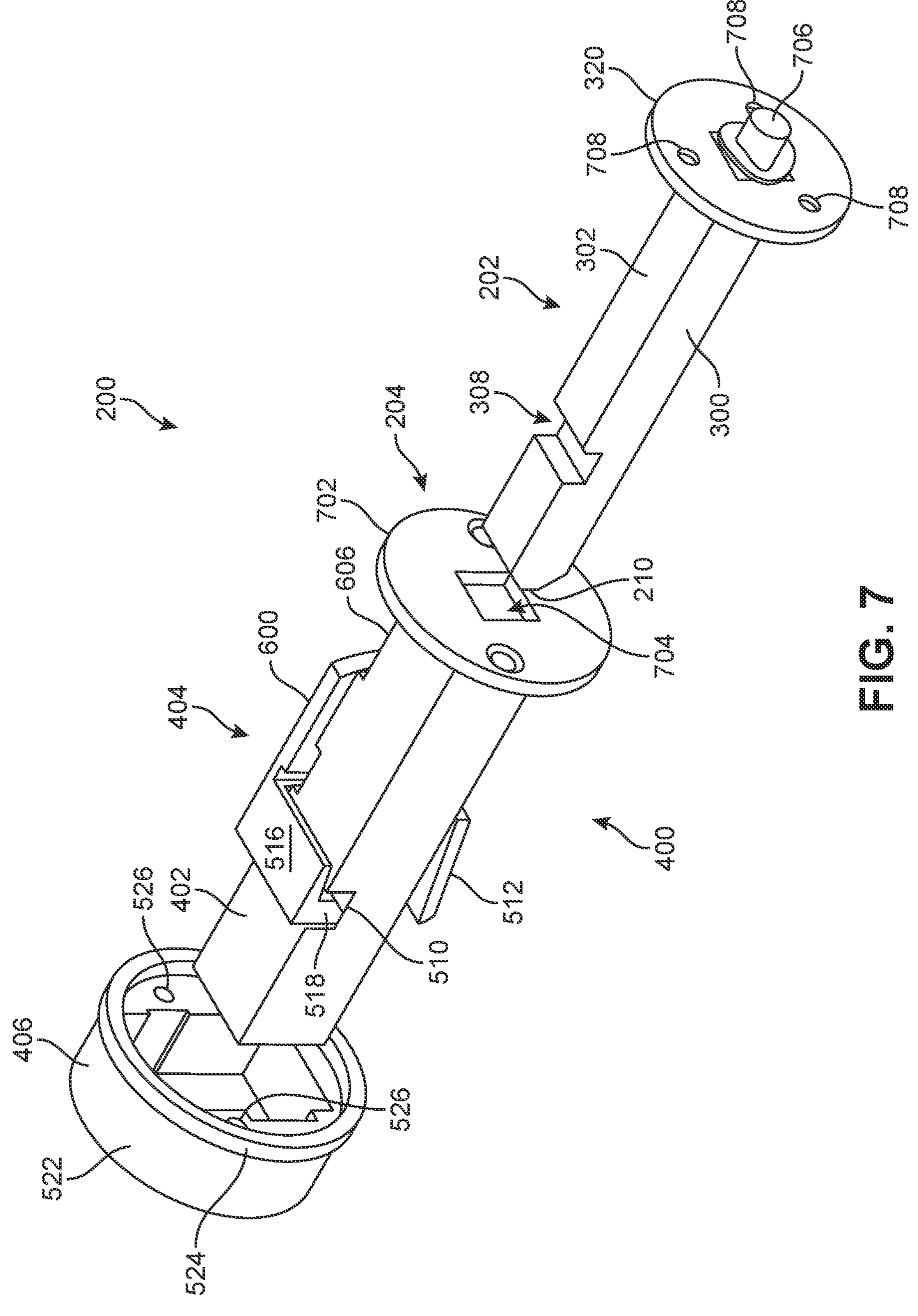
FIG. 7 is an exploded plan view of an example embodiment of the mannequin display fitting lock mechanism.

FIG. 7 shows an exploded view of the components of display fitting lock mechanism 200 according to an example embodiment. In this embodiment, the components of lock mechanism 200 are shown, including shaft member 202 and receiving portion 204. As shown in FIG. 7, collar portion 406 is configured to be associated with a mannequin part, such as first arm 104 and/or second arm 114, either during manufacture of the part or added afterwards. When collar portion 406 is inserted into the mannequin part, collar body 522 extends into the mannequin part and lip 524 of collar insert 406 extends around the opening into the mannequin part. If collar portion 406 is being added to a manufactured part, fastener holes 526 may be used to secure or attach collar insert 406 to the mannequin part.

Next, receiver assembly 400, including straight tube 402 and locking clamp 404 are inserted into collar insert 406 so that straight tube 402 extends into the mannequin part. In this embodiment, locking clamp 404 can be seen connected to second side face 606 of straight tube 402 via fastener 604 at pivot point 602. A torsion spring (not shown) is coiled around fastener 604 between an inner side of side surface 600 of locking clamp 404 and second side face 606 of straight tube 402. Locking tooth 518 of locking clamp 404 is extended into recess 510 of straight tube 402 and compression spring 514 is between bottom face 504 of straight tube 402 and the inner side of bottom clamp surface 512.

In some embodiments, a plate 702 is located at one end of straight tube 402 and includes an opening 704 to receive shaft body 300 of shaft member 202. In this embodiment, plate 702 has a circumference that corresponds to the inner circumference of collar insert 406 so that plate 702 sits within and is surrounded by lip 524 of collar insert 406 when assembled. In one embodiment, opening 704 in plate 702 has a square cross-sectional shape that corresponds to the same cross-sectional shape as interior channel 508 of straight tube 402 and shaft body 300 of shaft member 202. In other embodiments, for example, where interior channel 508 and shaft body 300 have different corresponding shapes, opening 704 also has the same different corresponding shape.

In an example embodiment, shaft member 202 includes plate 320 disposed at an end opposite tip 210 and may be secured to shaft body 300 using a fastener 706. Additionally, plate 320 may also include one or more fastener holes 708 disposed around plate 320 to allow plate 320 and, thereby, shaft member 202, to be secured or attached to a mannequin part, such as hard part 110 and/or hand part 120. For example, fasteners such as screws or bolts may be used to attach plate 320 to first end 206 of hand part 110 (as shown in FIG. 3). With this arrangement, a mannequin part may be provided with shaft member 202 of locking mechanism 200 in order to mate with receiving portion 204 of lock mechanism 200 on another mannequin part of mannequin 100 (e.g., first arm 104).

Figure 8:
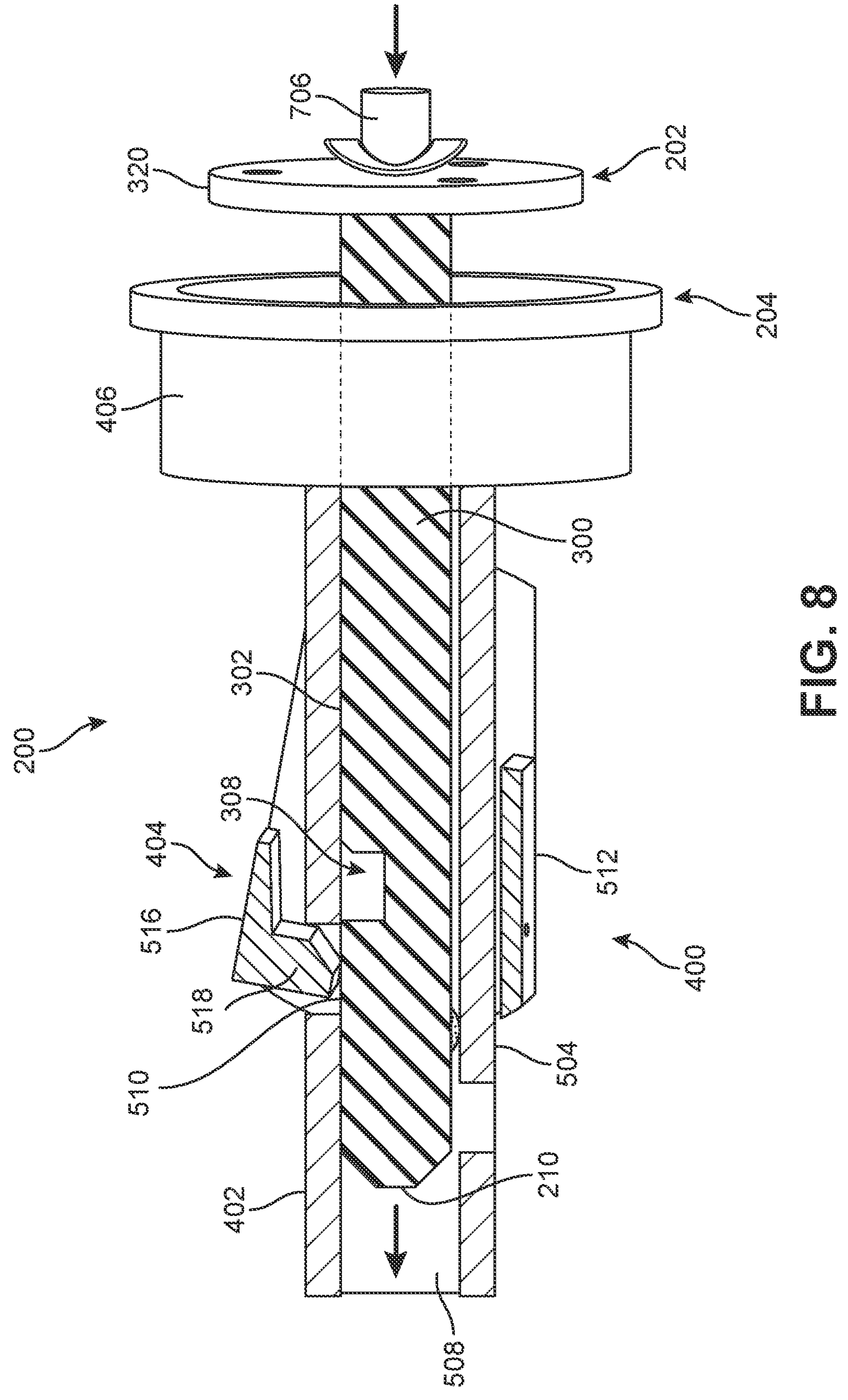
FIG. 8 is a schematic view of a shaft member of the mannequin display fitting lock mechanism fitting into the receiving portion of the mannequin display fitting lock mechanism.

Referring now to FIGS. 8 through 11, an exemplary process of locking and unlocking lock mechanism 200 is described. FIG. 8 illustrates the separate portions of display fitting lock mechanism 200, including shaft member 202 and receiving portion 204, being mated together. For example, FIG. 8 may illustrate an example scenario when hand part 110 of mannequin 100 is attached to first arm 104 of mannequin 100 at first lower attachment point 108. In this embodiment, shaft body 300 of shaft member 202 of lock mechanism 200 is being inserted into interior channel 508 of straight tube 402 of receiver assembly 400 of receiving portion 204 of lock mechanism 200. As shaft body 300 slides along interior channel 508 of straight tube 402, locking tooth 518 of locking clamp 404 remains in an unlocked position pressing against top face 302 of shaft body 300.

Figure 9:
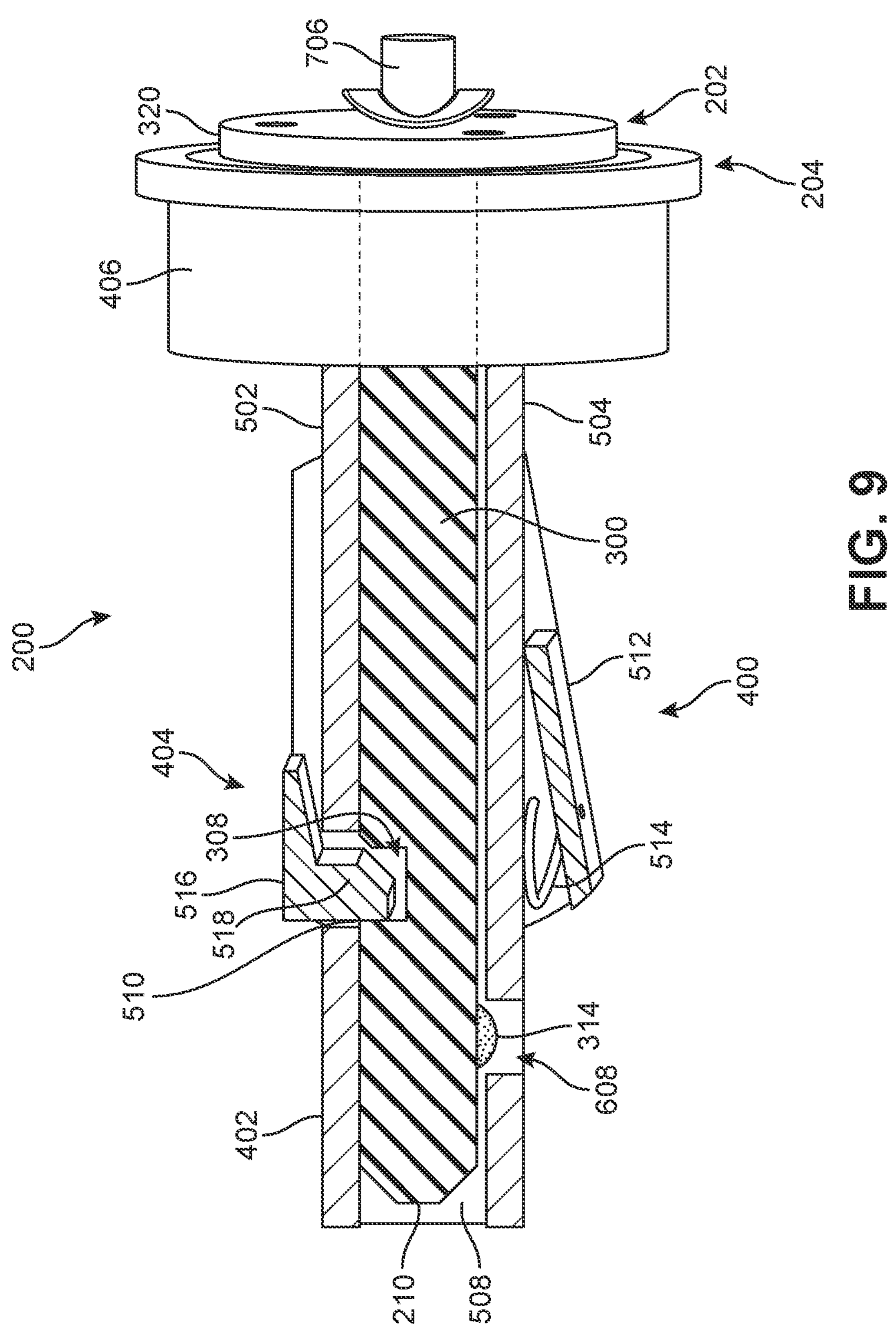
FIG. 9 is a schematic view of the mannequin display fitting lock mechanism locking the shaft member in place relative to the receiving portion.

Referring next to FIG. 9, lock mechanism 200 is shown with shaft member 202 in a locked position secured in place relative to receiving portion 204. As plate 320 of shaft member 202 is brought in contact with collar insert 406 at lip 524, shaft body 300 of shaft member 202 extends fully into interior channel 508 of straight tube 402 of receiver assembly 400 of receiving portion 204. In this locked position, locking tooth 518 of locking clamp 404 extends through recess 510 in straight tube 402 and into recess 308 of shaft body 300 of shaft member 202. With this arrangement, locking tooth 518 of locking clamp 404 within recess 308 in the locked position prevents shaft body 300 of shaft member 202 from being removed from receiving portion 204. Thus, when lock mechanism 200 is in this locked position, mannequin parts, such as hand part 110, are prevented from being separated or removed from mannequin 100 or another mannequin part, such as first arm 104.

As can be seen in FIG. 9, when locking clamp 404 is in this locked position, top surface 516 is substantially flat and parallel to top face 502 of straight tube 402, while bottom clamp surface 512 is at an angle with respect to bottom face 504. Additionally, compression spring 514 disposed between bottom face 504 and the inner side of bottom clamp surface 512 of locking clamp 404 assists with keeping locking tooth 518 within recess 308 of shaft body 300 of shaft member 202. Detent hole 608 and retaining ball 314 also provide a mechanical friction fit that acts to keep lock mechanism 200 in the locked position when shaft body 300 of shaft member 202 is locked in place within interior channel 508 of straight tube 402 of receiving portion 204.

Figure 10:
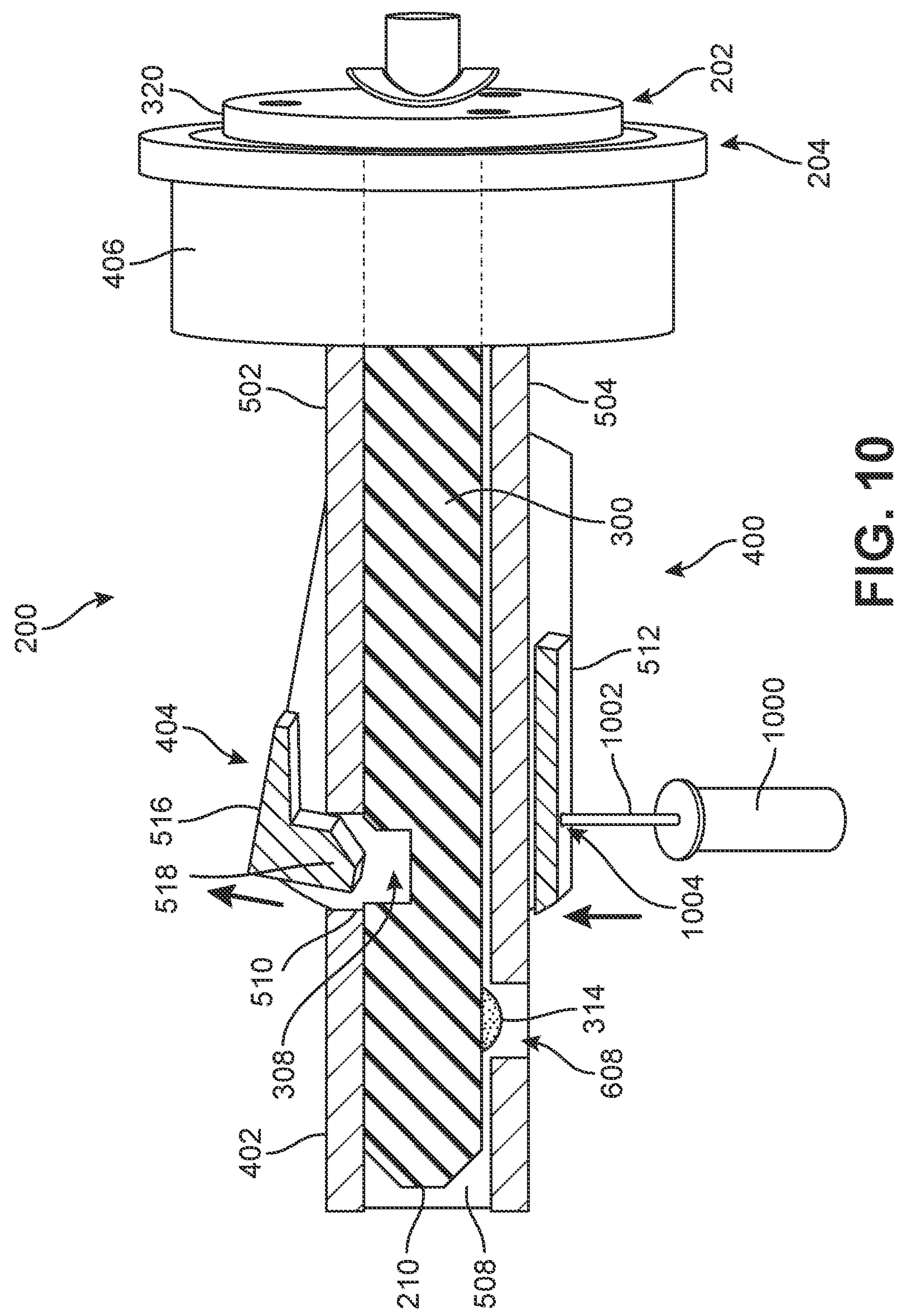
FIG. 10 is a schematic view of a releasing tool being used to unlock the mannequin display fitting lock mechanism to release the shaft member from the receiving portion of the mannequin display fitting lock mechanism.

In some embodiments, lock mechanism 200 remains in the locked position until locking clamp 404 is unlocked. This prevents the mannequin parts attached by lock mechanism 200 from being removed or stolen. Referring now to FIG. 10, an example embodiment of a release tool 1000 being used to unlock mannequin display fitting lock mechanism 200 to release shaft member 202 from its engagement with receiving portion 204 so that shaft body 300 may be pulled out of interior channel 508 of straight tube 402. As shown in this embodiment, release tool 1000 includes a shaft 1002 that is configured to engage with a depression 1004 in first (bottom) clamp surface 512 of locking clamp 404. For example, in embodiments where lock mechanism 200 is disposed within a mannequin or mannequin part, the mannequin or mannequin part that contains receiver assembly 400 of receiving portion 204 of lock mechanism 200 may include a small access hole (not shown) that allows access through the exterior of the mannequin or mannequin part so that shaft 1002 of release tool 1000 may engage depression 1004 in first clamp surface 512 of locking clamp 404.

In an example embodiment, when shaft 1002 of release tool 1000 is engaged with depression in first clamp surface 512 of locking clamp 404, an upwards force applied to release tool 1000 compresses compression spring 514 holding first clamp surface 512 at an angle relative to bottom face 504 of straight tube 402. As first clamp surface 512 of locking clamp 404 is brought into contact and/or parallel to bottom face 504 of straight tube 402, the upward force causes locking clamp 404 to pivot around fastener 604 at pivot point 602 on second side face 606 of straight tube 402. The pivoting of locking clamp 404 causes second (top) clamp surface 516 of locking clamp 404 to move upwards away from top face 502 of straight tube 402. This movement of locking clamp 404 disengages or removes locking tooth 518 out of engagement with recess 308 of shaft body 300 of shaft member 202 to unlock lock mechanism 200.

Figure 11:
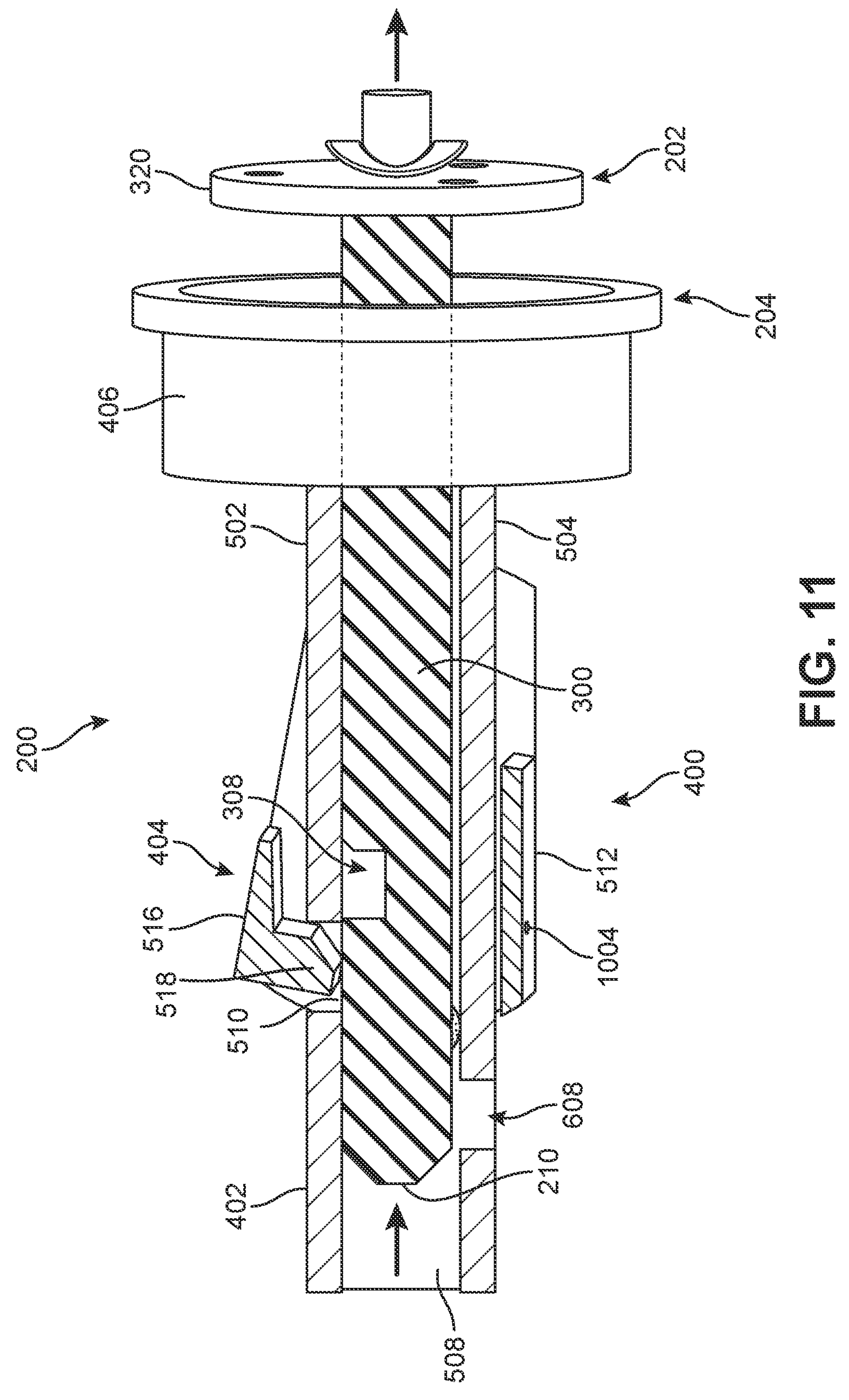
FIG. 11 is a schematic view of the shaft member being removed from the receiving member of the mannequin display fitting lock mechanism.

For example, as shown in FIG. 10, as release tool 1000 presses upwards on first (bottom) clamp surface 512, locking tooth 518 is removed from recess 308 of shaft body 300 of shaft member 202 and recess 510 in top face 502 of straight tube 402 of receiver assembly 400 of receiving portion 204 of lock mechanism 200. As shown in FIG. 11, once lock mechanism 200 is in the unlocked position, shaft body 300 of shaft member 202 may be removed or withdrawn from within interior channel 508 of straight tube 402 of receiver assembly 400 of receiving portion 204. With this arrangement, release tool 1000 may be used to unlock locking clamp 404 from the locked position (as shown in FIG. 9) to the unlocked position (as shown in FIG. 10) to transition lock mechanism 200 from locked to unlocked so that the mannequin part (e.g., hand part 110) may be detached or released from connection with another mannequin part (e.g., first arm 104).

In some embodiments, lock mechanism 200 may be provided as a kit of parts so that a display fitting on an already manufactured mannequin may be retrofitted to include the mannequin display fitting lock mechanism of the present embodiments. In an example embodiment, a kit of parts for a mannequin display lock mechanism may include lock mechanism 200 with shaft member 202 and receiving portion 204. Shaft member 202 included in the kit of parts may also include plate 320 with one or more fastener holes 708 (as shown in FIG. 7) to allow a purchaser of the kit of parts to attach shaft member 202 of lock mechanism 200 to a mannequin part, such as a hand part or foot part. Receiving member 204 included in the kit of parts includes receiver assembly 400 with collar insert 406 that includes fastener holes 526 to allow the purchaser of the kit of parts to attach receiving portion 204 of lock mechanism 200 to another mannequin part, such as an arm part or leg part. In one embodiment, the kit of parts may further include release tool 1000. With this arrangement, the kit of parts for a mannequin display lock mechanism allows purchasers to retrofit existing mannequins to include lock mechanism 200 of the present embodiments so as to prevent mannequin parts from being lost or stolen.

While the example embodiment of mannequin 100 is in the form of a partial body, other embodiments of mannequins including the display fitting lock mechanism of the described embodiments may be full body mannequins that include legs and/or feet. Additionally, a lock mechanism according to the techniques described herein may also be used to secure mannequin foot parts to a mannequin leg in such embodiments.

Mannequins often are made from synthetic polymers, or plastic. The properties and characteristics of plastics vary significantly, as do the costs. One polymer that has been found suitable for mannequins is ABS. ABS is a thermoplastic terpolymer comprising long chain polybutadiene cross-linked with shorter chains of poly (styrene-co-acrylonitrile). In an example embodiment, torso 102 of mannequin 100 may be made of ABS or other polymers. One or more mannequin parts, including arms, legs, hands, and/or feet may be formed from ABS, PVC, polyurethane, fiberglass, wood, metal, or combinations thereof. Other materials known to one of ordinary skill in the art may be used to manufacture mannequins, including mannequin parts thereof, in accordance with the present embodiments.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A display fitting lock mechanism for a mannequin, comprising:
- a shaft member having a shaft body including a recess;
- a receiving portion having a straight tube, wherein the straight tube includes an interior channel extending through a longitudinal length of the straight tube that is configured to receive the shaft body of the shaft member, wherein the shaft body includes a retaining ball on a face opposite from the recess, and wherein the retaining ball is configured to mechanically engage with a detent hole inside the interior channel in the straight tube of the receiving portion; and
- a locking clamp attached to the straight tube, the locking clamp having a locking tooth that is configured to extend into the recess in the shaft body when the locking clamp is in a locked position;
- wherein the locking clamp further comprises:
  - a first clamp surface disposed along a bottom face of the straight tube;
  - a second clamp surface disposed along a top face of the straight tube, the locking tooth projecting vertically beneath the second clamp surface; and
  - a compression spring located between the bottom face of the straight tube and an inner side of the first clamp surface.

2. The display fitting lock mechanism according to claim 1, wherein the straight tube includes a recess aligned with the recess in the shaft body of the shaft member.

3. The display fitting lock mechanism according to claim 1, wherein the locking clamp is attached to a side face of the straight tube at a pivot point by a fastener.

4. The display fitting lock mechanism according to claim 3, wherein the locking clamp is configured to pivot around the fastener at the pivot point to move between the locked position and an unlocked position.

5. The display fitting lock mechanism according to claim 1, wherein the receiving portion further comprises a collar insert configured to hold the straight tube inside a first mannequin part.

6. The display fitting lock mechanism according to claim 5, wherein the shaft member further comprises a plate configured to attach to an end of the shaft body opposite a tip.

7. The display fitting lock mechanism according to claim 6, wherein the plate is configured to attach the shaft member to a second mannequin part; and
- wherein the first mannequin part and the second mannequin part are configured to be removably connected at an attachment point by the display fitting lock mechanism.

8. The display fitting lock mechanism according to claim 1, wherein the compression spring acts to bias the locking clamp in the locked position.

9. A display fitting lock mechanism for a mannequin, comprising:
- a shaft member having a shaft body extending from one end to a tip at an opposite end, the shaft body having a recess;
- a receiving portion including a straight tube having an interior channel extending through a longitudinal length of the straight tube that is configured to receive the shaft body of the shaft member, wherein the straight tube of the receiving portion includes a recess aligned with the recess in the shaft body of the shaft member;
- a locking clamp attached to the straight tube, the locking clamp having a locking tooth that is configured to extend into the recess in the shaft body through the recess in the straight tube to lock the shaft member in position relative to the receiving portion;
- wherein the locking clamp further comprises:
  - a first clamp surface disposed along a bottom face of the straight tube;
  - a second clamp surface disposed along a top face of the straight tube, the locking tooth projecting vertically beneath the second clamp surface; and
  - a compression spring located between the bottom face of the straight tube and an inner side of the first clamp surface;
- wherein the shaft member is locked in position relative to the receiving portion when the shaft body of the shaft member is fully inserted into the interior channel of the straight tube of the receiving portion; and
- wherein the shaft body has a square cross-sectional shape.

10. The display fitting lock mechanism according to claim 9, wherein the shaft body includes a retaining ball on a face opposite from the recess; and wherein the retaining ball is configured to mechanically engage with a detent hole inside the interior channel in the straight tube of the receiving portion.

11. The display fitting lock mechanism according to claim 9, wherein one side of the locking tooth includes a beveled surface.

12. The display fitting lock mechanism according to claim 9, wherein the interior channel in the straight tube of the receiving portion has a square cross-sectional shape that corresponds to the square cross-sectional shape of the shaft body of the shaft member.

13. The display fitting lock mechanism according to claim 9, wherein the tip includes chamfered edges.

14. The display fitting lock mechanism according to claim 9, wherein the shaft member further comprises a plate configured to attach to the one end of the shaft body opposite the tip; and wherein the plate is configured to attach the shaft member to a mannequin part.

15. The display fitting lock mechanism according to claim 9, wherein the locking clamp is attached to a side face of the straight tube at a pivot point by a fastener.

16. The display fitting lock mechanism according to claim 15, wherein the locking clamp is configured to pivot around the fastener at the pivot point to move between the locked position and an unlocked position; and wherein the compression spring acts to bias the locking clamp in the locked position.

17. A kit of parts for a display fitting lock mechanism for a mannequin, comprising:

a shaft member having a shaft body including a recess;

a receiving portion having a straight tube including a recess aligned with the recess in the shaft body of the shaft member, wherein the straight tube includes an interior channel extending through a longitudinal length of the straight tube that is configured to receive the shaft body of the shaft member, wherein the shaft body includes a retaining ball on a face opposite from the recess and wherein the retaining ball is configured to mechanically engage with a detent hole inside the interior channel in the straight tube of the receiving portion; and a locking clamp attached to the straight tube, the locking clamp having a locking tooth that is configured to extend into the recess in the shaft body through the recess in the straight tube when the locking clamp is in a locked position;

wherein the locking clamp further comprises:

a first clamp surface disposed along a bottom face of the straight tube;

a second clamp surface disposed along a top face of the straight tube, the locking tooth projecting vertically beneath the second clamp surface; and a compression spring located between the bottom face of the straight tube and an inner side of the first clamp surface.

18. The kit of parts according to claim 17, wherein the receiving portion further comprises a collar insert configured to hold the straight tube inside a mannequin part.

19. The kit of parts according to claim 17, wherein the shaft member further comprises a plate configured to attach to an end of the shaft body opposite a tip;

wherein the plate is configured to attach the shaft member to a mannequin part.

20. The kit of parts according to claim 17, further comprising:

a release tool, the release tool having a shaft that is configured to engage with the first clamp surface of the locking clamp to push the locking tooth out of the recess in the shaft body of the shaft member to transition the locking clamp from the locked position to an unlocked position.

* * * * *